Figure 1:
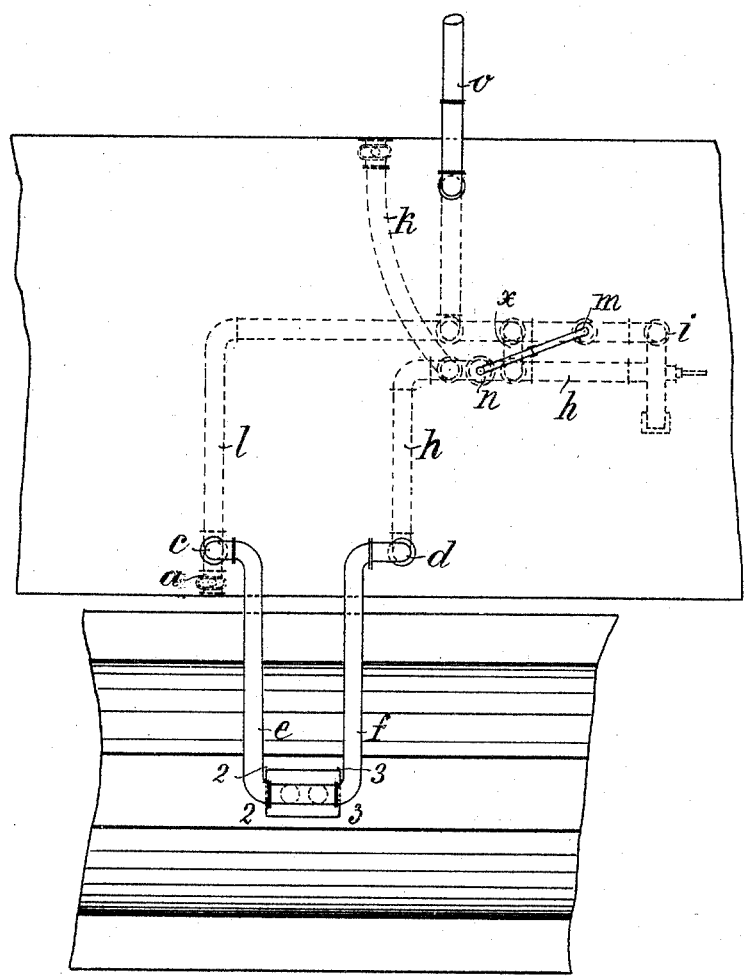

No. 776,050. PATENTED NOV. 29, 1904.
O. FRÜHLING.
DREDGING DEVICE.
APPLICATION FILED MAR. 9, 1904.
NO MODEL. 9 SHEETS—SHEET 1.

No. 776,050. PATENTED NOV. 29, 1904.
O. FRÜHLING.
DREDGING DEVICE.
APPLICATION FILED MAR. 9, 1904.
NO MODEL. 9 SHEETS—SHEET 2.

No. 776,050. PATENTED NOV. 29, 1904.
O. FRÜHLING.
DREDGING DEVICE.
APPLICATION FILED MAR. 9, 1904.
NO MODEL. 9 SHEETS—SHEET 3.
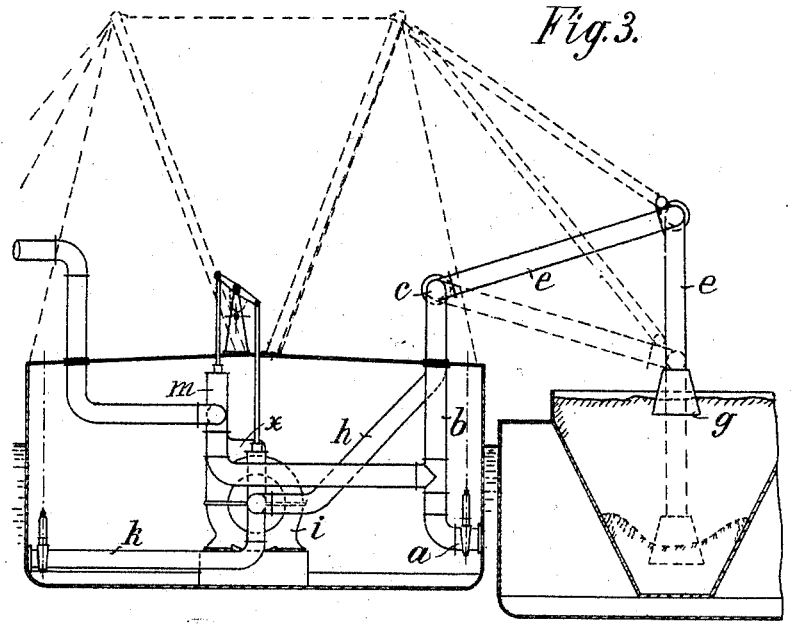
Fig. 3.
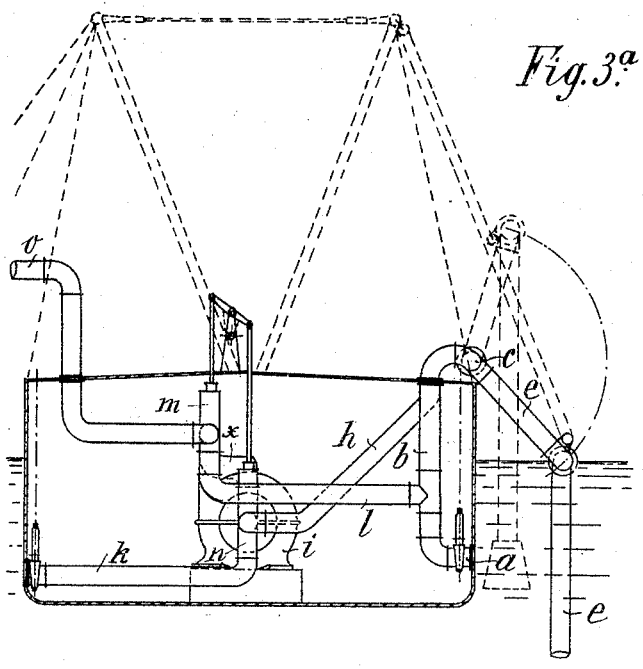
Fig. 3.ᵃ

No. 776,050. PATENTED NOV. 29, 1904.
O. FRÜHLING.
DREDGING DEVICE.
APPLICATION FILED MAR. 9, 1904.
NO MODEL. 9 SHEETS—SHEET 4.
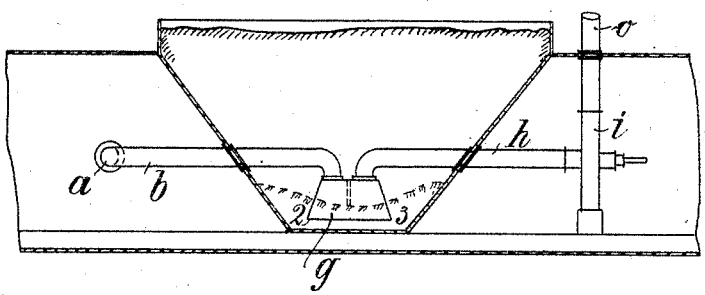
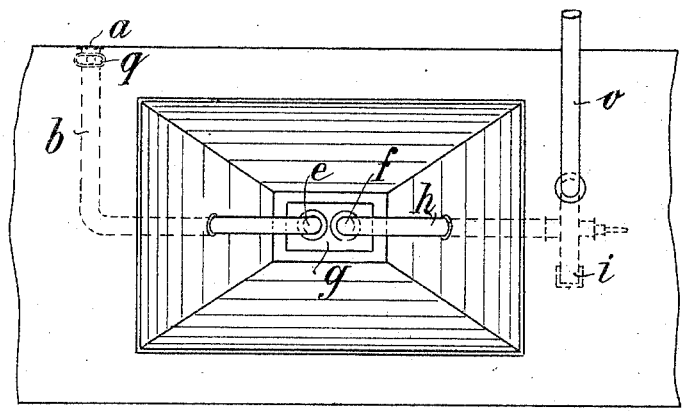
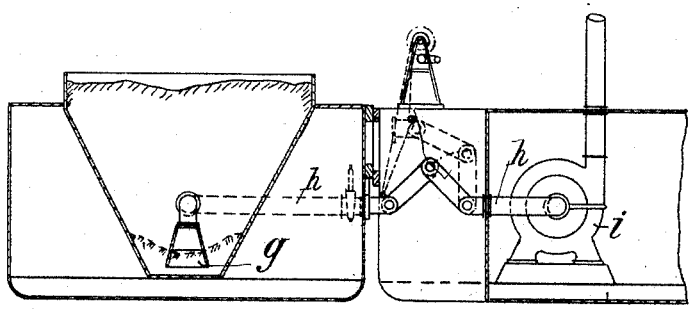
Witnesses
Inventor
Otto Frühling
by Foster Freeman & Watson
Attorneys.

No. 776,050. PATENTED NOV. 29, 1904.
O. FRÜHLING.
DREDGING DEVICE.
APPLICATION FILED MAR. 9, 1904.
NO MODEL. 9 SHEETS—SHEET 5.
Fig. 4.ª
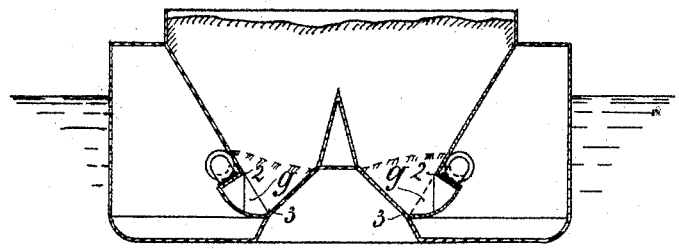
Fig. 5.ª
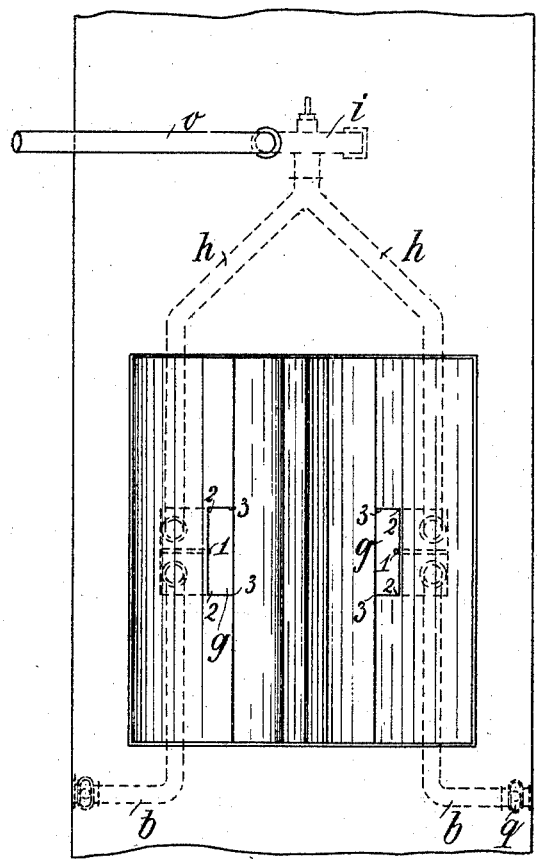
Witnesses
Inventor
Otto Frühling
by
Attorneys.

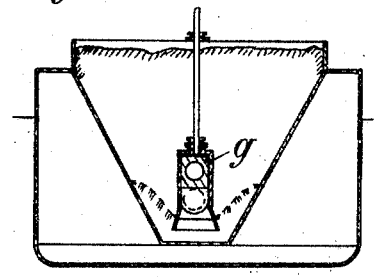
Fig. 7.
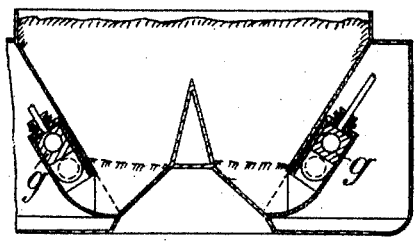
Fig. 7ª.
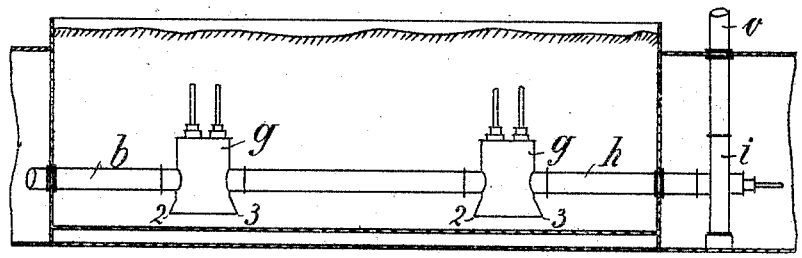
Fig. 8.
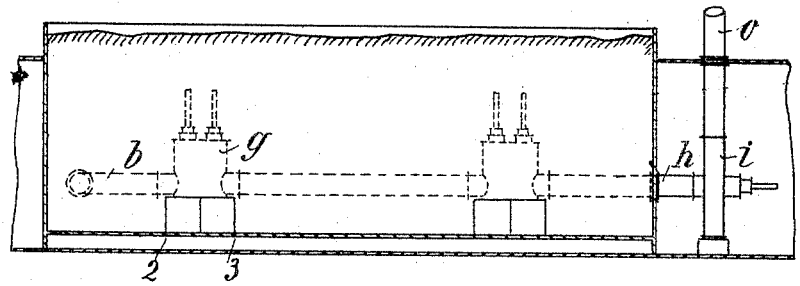
Fig. 8ª.

No. 776,050. PATENTED NOV. 29, 1904.
O. FRÜHLING.
DREDGING DEVICE.
APPLICATION FILED MAR. 9, 1904.
NO MODEL. 9 SHEETS—SHEET 7.
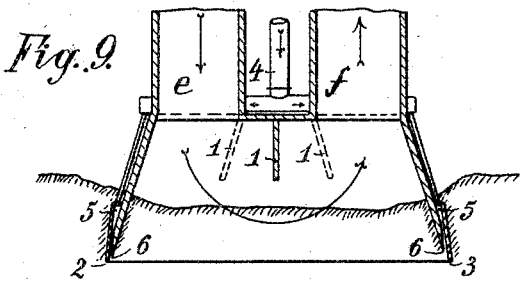
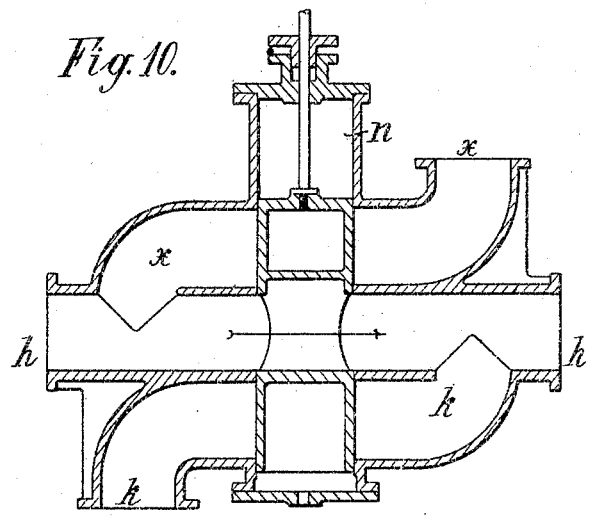
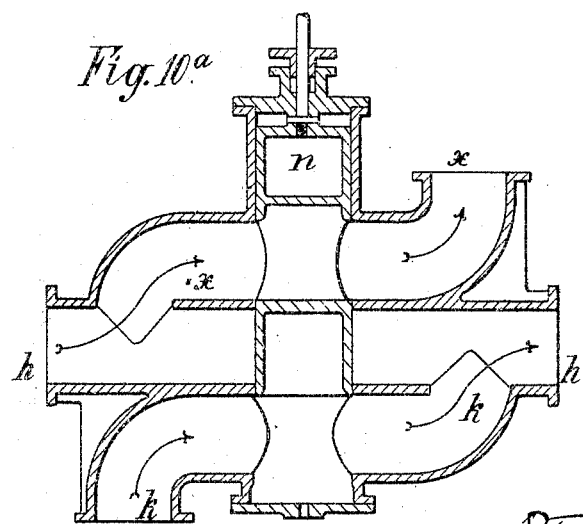

No. 776,050. PATENTED NOV. 29, 1904.
O. FRÜHLING.
DREDGING DEVICE.
APPLICATION FILED MAR. 9, 1904.
NO MODEL. 9 SHEETS—SHEET 8.
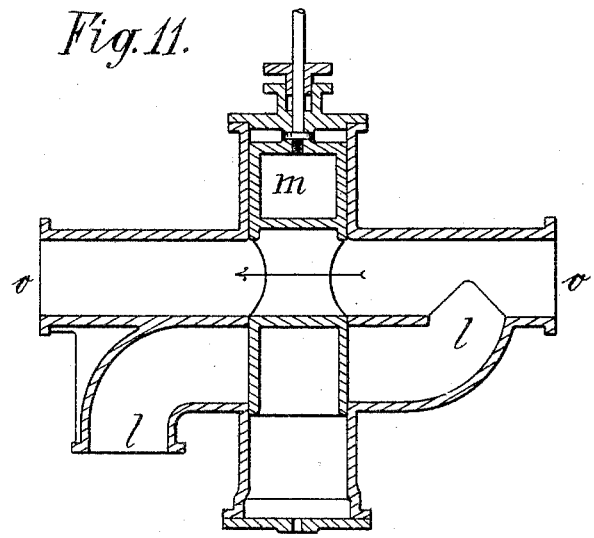
Fig. 11.
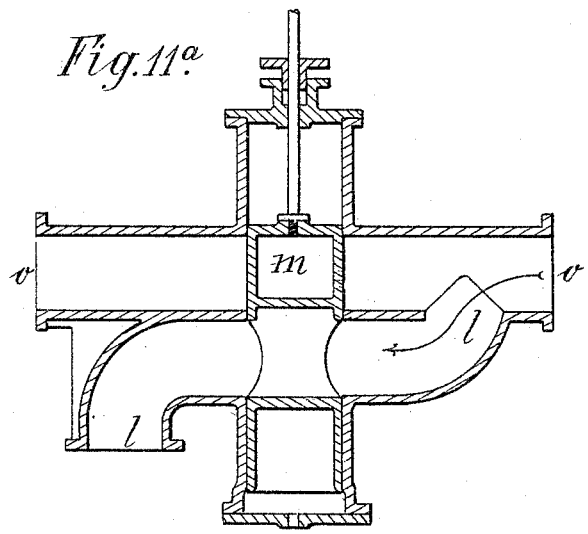
Fig. 11ª.

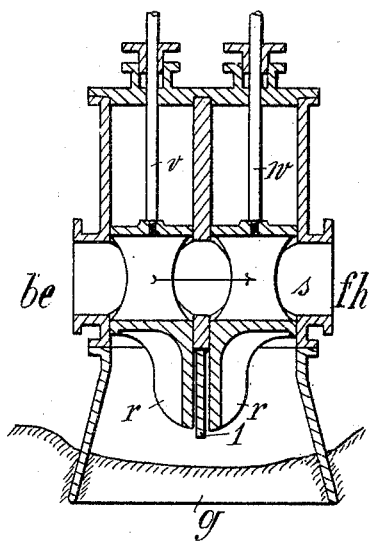
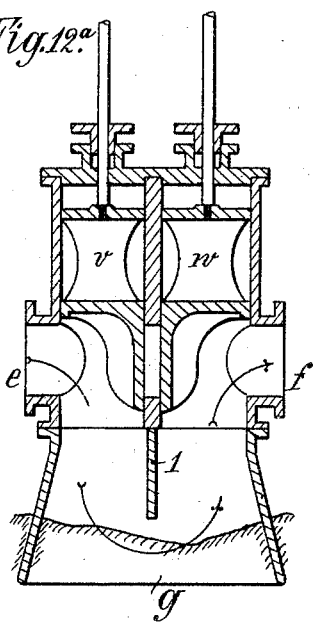
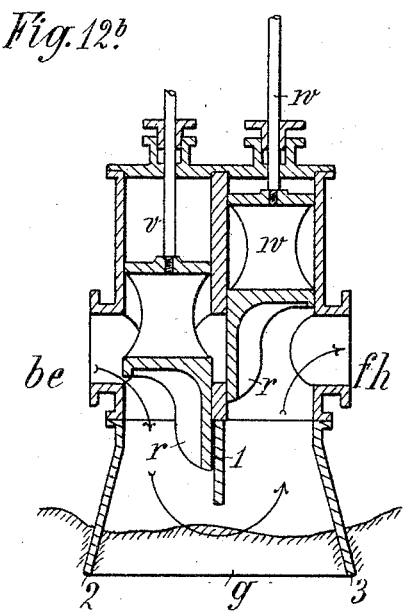

No. 776,050.

Patented November 29, 1904.

UNITED STATES PATENT OFFICE.

OTTO FRÜHLING, OF BRUNSWICK, GERMANY.

DREDGING DEVICE.

SPECIFICATION forming part of Letters Patent No. 776,050, dated November 29, 1904.

Application filed March 9, 1904. Serial No. 197,275. (No model.)

*To all whom it may concern:*

Be it known that I, OTTO FRÜHLING, civil engineer, a subject of the Duke of Brunswick, residing at 5 Monumentsplatz, in the city of Brunswick, in the German Empire, have invented a certain new and useful Dredging Device, of which the following is a specification.

This invention has reference to a dredging device for removing dredging-soil from ships or from the ground of a stagnant or flowing water by suction.

The invention is intended to facilitate the work of emptying ships or other containers of dredging-soil and also to render much easier the operation of raising such soil, which has to be removed from building-grounds or for the purpose of deepening already existing waters.

The improvement in the raising of the soil, as compared with the former method and the peculiarity of the new method about to be described, resides in the following facts: First, the water necessary for the sucking out of the soil does not need to be pumped into the containers by a special pumping device, as is the case in the canoe suction devices now in use, the water, on the contrary, flowing in directly and by the action of the suction-pump only; second, the entire arrangement of the pipe-conduits, which serve for the admission of the water required for the sucking operation and for the sucking off of the dredging-soil, is considerably simplified; third, the new arrangement permits of acting upon the soil to be dredged and of disintegrating the same in a closed space in a bell-shaped chamber and by means of water sucked up by the dredging-pump; fourth, the quantity of water to be admitted into the interior of the bell-shaped chamber for action upon the soil and for the disintegration of the same, and consequently, also, the amount of water contained in the masses to be pumped out from the bell, may be increased or decreased in any suitable manner.

These advantages are attained by the new arrangement of dredging device, which is so constructed as to provide means whereby an apparatus with closed top and closed side walls, which I will call a "bell," is placed over those points of the ground from which the soil is to be removed, the said bell, the front opening of which covers the soil to be removed, being inserted in a pipe-conduit, one end of which leads into the open water, while the other end of the same is connected to the dredging-pump.

Figure 2:
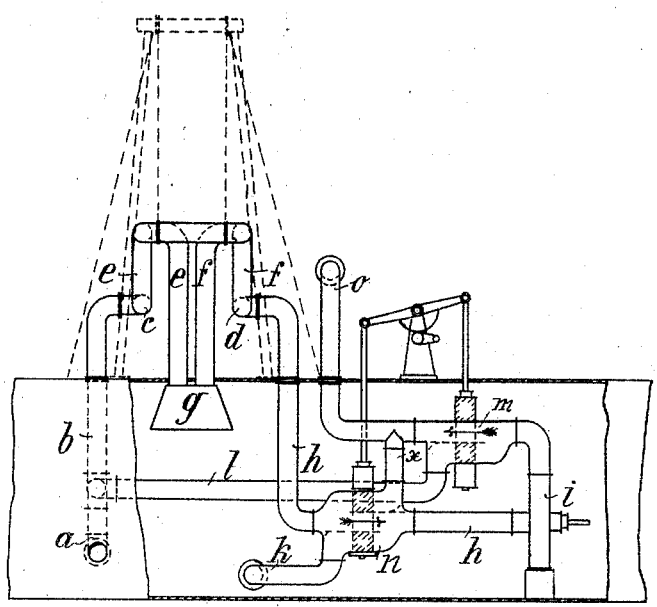

The novel dredging device is applied in two different modifications, according to the particular conditions prevailing in certain cases. A movable bell is used in such cases where the dredging device is to be constructed independently of the spaces to be emptied, as in the case of emptying ships which are to be placed close to the dredger or in the case of deepening building-grounds or already existing waters. These cases are illustrated by Figs. 1 to 3 of the drawings and by Fig. 3$^a$, respectively. Stationary bells, however, are used where the emptying device is to remain permanently connected to the space to be emptied. Such forms of execution are shown in Figs. 4 to 8 of the drawings. The other figures refer to constructional details, which will be mentioned in their respective places.

Figs. 1 to 3 represent the entire arrangement of the dredging apparatus provided with a movable bell in plan view, side view, and rear view. A ship to be emptied is represented as lying close to the dredger. The pipe-conduit of the dredging device starts below the level of the water at the water-admission opening $a$, which may be closed, if desired, with the suction-conduit $b$, which leads to a rotating center $c$, which corresponds with another rotating center $d$, arranged on the stationary pipe system opposite to the first rotating center and beyond which the stationary pipe-conduit is extended. Between these two rotating or pivoting points $c$ and $d$ a pipe-conduit $e\ e\ f\ f$, capable of oscillating movement, is arranged, from which the bell $g$ is suspended, so as to enable it to descend gradually. From the stationary pivoting-point $d$ a pipe-conduit $h$ leads off to the dredging-pump $i$, from which the dredging-soil is forced out through another pipe-conduit.

The general outlines of the movable bell $g$ are represented in Fig. 9. Upon the top of the bell-shaped body are provided nipples for connection with admission and discharge conduits $e$ and $f$, respectively. In order to increase the efficiency of the action of the current of water sucked up through the branch pipe b e upon the soil contained within the bell, one or more tongues 1 may be provided in the interior of the bell which direct the current of water which flows through the bell toward the soil to be disintegrated. The number, the length, and the shape of these tongues depend upon the nature of the soil to be removed, and in this respect the bell is adapted to the conditions of the soil. In order to assist the sinking down of the bell into the soil which is to be dredged out, the bell may also be so arranged and constructed that two or three jets of water under pressure can issue from its entrance-opening. For this purpose a pressure water-pipe 4 leads down to the lower part of the bell and to a channel 5, which surrounds the rim of the opening of the bell and from which jets 6 of water under pressure may issue in any suitable manner.

In the arrangement of the device, as shown in Figs. 1 to 3 and $3^a$, respectively, the branch pipes from the water-inlet to the bell and extending from the bell to the pump are partly above the water-level, so that the branch pipes have to operate as siphons. It is therefore also necessary to provide an easily-manipulated device for filling both branches of the pipe-conduit both between the bell and the water-entrance opening and between the bell and the pump and between the bell itself for the purpose of being able to remove the air from the spaces before commencing the raising of the soil and in case air should accumulate during the raising operation in the branches of the pipe. With this end in view a second separate suction branch conduit $k$ and a second separate pressure branch conduit $l$ is connected to the pipe-conduit $b$ and the casing of the valve $m$, hereinafter referred to, a conduit $x$ connecting the casing of valve $n$, which is arranged in the conduit $h$, with the discharge-pipe $o$, the said conduits being so arranged and said valves being of such character that by a reversal of the valves the branches of the pipes can be shut off alternately from the pump. The branch conduit $k$, which can be closed against the entrance of water by a bottom valve in the same manner as the pipe $a$, leads from the open water into a valve-casing, Figs. 1, 3, the special construction of which is illustrated by Figs. 10 and $10^a$. From the valve-casing this branch of piping which is entirely under water leads through the valve $n$ into the pipe-conduit $h$ and to the pump. The other auxiliary branch pipe $l$ branches off from the suction-pipe $b$ and leads to a valve-casing, Fig. 11, to which the conduit which leads to the pressure-pipe $o$ is connected through the valve $m$ in accordance with the positions Fig. 11 and Fig. $11^a$, respectively. The valves $m$ and $n$ are connected to each other and are controlled by the reversal of a single lever. The shifting of the valves and the consequent filling of the pipes may be effected at any time and as often as desired during the operation of the pump whenever it is necessary to fill the pipes. The escape of water through the opening at $a$ into the open water during the filling operation is automatically prevented by providing a bottom valve, while the escape below and through the rim of the bell is prevented by putting the bell tightly upon the ground. If the dredging-pump is started after the bell has been lowered upon the place where the soil is to be dredged out and after the pipe-conduit has been filled with water, Figs. 1, 2, 3, and $3^a$, water is sucked in through the branch $a\ b\ e$ of the pipe-conduit, the water entering into the bell $g$ and then flowing to the pump $i$ through the pipe $f\ h$. Upon continuing the operation of the pump the water which has been sucked in flows uninterruptedly through the bell, and by the force of its current it breaks loose the soil which is covered by the bell or which has entered into the same and takes it up to the pump.

During the dredging operation the valves $m$ and $n$ are in the position shown in the drawings in Fig. 2 and in Figs. 10 and 11. In this position the branches $f$, $h$, and $o$ of the pipe-conduit are open to the direct action of the pump, while the branches $k$ and $l$ are closed. The water is sucked in at $a$, ascends in $b$, descends to the bell $g$, thence it ascends in $f$, descends through this pipe to the pump, and is forced out by the pump through $o$. If there is air in the branch pipes $b\ e$ and $f\ h$ and if these branch pipes are to be filled with water, the valves $m$ and $n$ are reversed into the position shown in Figs. $10^a$ and $11^a$ and without stopping the pump. The branch pipes $f$, $h$, and $o$ are then closed for the direct action of the pump, while $k$ and $l$ are opened. The water enters now through the conduit $k$ and into the pump and is forced out by the pump through the valve $m$ and the pipe $l$ and into $b$, whence it passes to the bell $g$ and from this through $f$, $h$, $x$, and $o$ to the outside. By this means the branch pipes $b\ e$ and $f\ h$ and the bell $g$ will be filled completely with water by the action of the dredging-pump by merely reversing the valves $m$ and $n$ and without influencing or interfering with the continuous run of the pump. By its weight the bell sinks gradually down during the pumping operation to the depth down to which the soil is to be removed underneath the bell. After this depth has been reached and if no more of the soil is forced into the bell by the pressure of the lateral masses which have been left standing the bell is lifted and moved laterally and placed above another surface, from which it has to remove the soil in the same manner. This process is repeated until the space under treatment has been emptied or until the shallowness operated upon is removed.

In case of employment of a stationary bell, as shown, for instance, in Figs. 4, 5, and 6, the walls of the space to be emptied are so constructed that the soil contained therein sinks down gradually by its own weight in the direction toward the opening of the bell in the ratio of the progress of the emptying operation. The bell may then be arranged within the space itself above the bottom of the same, as shown in Figs. 4, 5, 6, or it may be laterally arranged in any suitable manner, as shown, for instance, in Figs. 4$^a$, 5$^a$, and in accordance with the shape of the space to be emptied.

In the case of very long spaces several bells in succession may be mounted in the pipe-conduit, as shown, for instance, in Figs. 7, 7$^a$, 8, 8$^a$, in the same manner as shown with reference to one bell. In this case the bells are also provided with means allowing of their being connected and disconnected from the pipe-conduit, as may be desired. This device consists in providing the bells with an arrangement of slides, as shown in detail and by way of example in Figs. 7, 7$^a$, 8, 8$^a$, and in Figs. 12, 12$^a$, 12$^b$. It comprises two slide-valves $v$ $w$, arranged side by side and each provided with a passage $s$, corresponding to the pipe-conduit $b$ $h$, and below this passage each valve is provided with a projecting extension $r$, also corresponding in shape to the conduit. Fig. 12 shows the valves in their lowered position, and the bell $g$ is in this case cut off or separated from the conduit $b$ $h$, the water from the branch pipe $b$ passing directly through $s$ $s$ into the branch pipe $h$. Fig. 12$^a$ shows the valves $v$ $w$ in the raised position, the bell being then in communication with the pipe-conduit, the direct way being shut, so that the water has to pass from the branch pipe $b$ down into the bell $g$ and can only pass into the branch pipe $f$ by flowing around the tongue 1. Fig. 12$^b$ shows the valve $v$ partly raised, while the valve $w$ is raised completely. The direct path from A to B is shut by the valve $w$, so that the bell $g$ is connected with the conduit. By the position of the valve $v$ the branch pipe $b$ is opened; but the admission of water to the same is limited to a small proportion only. The operation of emptying in the case of such elongated spaces is preferably effected so that starting from one end the first bell is connected with the pump, while the others are disconnected therefrom, and after the soil within reach of the first bell has been removed the said bell is disconnected from the pump and the next bell of the series is connected therewith, and so on until all bells have been connected and respectively disconnected in succession and until the whole space is emptied.

The quantity of the water admitted into the bell may be limited in any suitable manner by the position of the valve $v$, according to Fig. 12$^b$, whereby the proportion of water contained in the mass which is pumped out from the bell may be restricted. This regulation of the water admitted to the bell is effected in those cases where the bells are employed without the arrangement of valves, before described, by means of a special valve $q$, mounted in the branch pipe $b$.

The restriction of the quantity of the water to be admitted into the bell becomes of importance in case the dredging-ground consists of very easily loosened material or of sludge or mud. In this case the action of the sucking-pump raises so much of the soil acted upon that the work of disintegration in the sucking current is necessary to a limited extent only, and for this reason the admission of water is then restricted as much as the kind of soil acted upon will allow, the operation of the dredging-pump being, however, continued with full force, so that the very liquid sludge is, for instance, sucked up thereby directly from the bottom of the bell only, even while the admission of water is shut off.

The several parts of the dredging arrangement, such as the pump and the emptying devices, may be mounted according to requirements, either on board ships, as shown in Figs. 1 to 8, or they may be stationed permanently on shore or upon underframes movable on shore.

What I claim, and desire to secure by Letters Patent of the United States, is—

1. In a suction dredging apparatus, the combination of a dredging-head, a conduit adapted to supply water to the interior of said head, and a suction-conduit leading from said head.

2. In a suction dredging apparatus, the combination of a bell-shaped dredging-head open at its lower side, a conduit adapted to supply water to the interior of said bell, and a suction-conduit leading from said bell.

3. In a suction dredging apparatus, the combination of a dredging-head, a conduit adapted to supply water to the interior of said head, a suction-conduit leading from said head, and a baffle-plate arranged within the head between said conduits.

4. In a suction dredging apparatus, the combination of a bell-shaped head, open at its lower side, a conduit for supplying the interior of said head, a suction-conduit leading from said head, and a baffle-plate arranged within the head between said conduits.

5. In a suction dredging apparatus, the combination of a head, open at one side, a conduit for supplying water to the interior of said head, a suction-conduit leading from said head, and means for directing the water entering the head from the supply-pipe toward the open side of the head in its passage to the suction-conduit.

6. The herein-described dredging device, consisting of a bell-shaped body, having suitable inlet and outlet ports formed in the wall opposite its open side, and a baffle arranged within the body between said ports.

7. The combination of a bell-shaped dredging-head, having suitable inlet and outlet ports formed therein, means within the head for directing water toward the open side of the bell in its passage from the inlet to the outlet port, and means for regulating the supply of water to the head.

8. In a dredging apparatus, the combination of a dredging-head, a conduit for supplying water to said head, a suction-duct leading from said head, and means for causing water to pass from said supply-conduit directly to the suction-duct or through said head at will.

9. In a dredging device, the combination of a bell-shaped dredging-head, a water-supply pipe communicating with a chamber in said head, a suction-conduit leading from said chamber, and valve mechanism mounted in said chamber and adapted to regulate the admission of water to said head and control its passage from the supply-pipe to the suction-conduit.

10. In a dredging apparatus, the combination of a dredging-head, a water-supply pipe connected with said head, a pump, a conduit connecting the pump and dredging-head, a valve in said conduit, a discharge-pipe connected with the pump, a valve in said discharge-pipe, an auxiliary water-supply pipe connected with the conduit leading from the dredging-head to the pump, and a branch duct connecting said conduit with the discharge-pipe, substantially as and for the purpose described.

11. In a dredging apparatus, the combination of a dredging-head, a water-supply pipe connected with said head, a pump, a conduit connecting the pump and dredging-head, a valve in said conduit, a discharge-pipe connected with the pump, a valve in said discharge-pipe, an auxiliary water-supply pipe connected with the conduit leading from the dreading-head to the pump, a branch duct connecting said conduit with the discharge-pipe, and means connecting said valves whereby they can be simultaneously operated.

In witness whereof I have hereunto signed my name in the presence of two subscribing witnesses.

OTTO FRÜHLING.

Witnesses:
   WOLDEMAR HAUPT,
   HENRY HASPER.